United States Patent
Aso et al.

(10) Patent No.: US 7,326,289 B2
(45) Date of Patent: Feb. 5, 2008

(54) FILM CONTAINING A PHOTO-CATALYST APATITE, ITS FORMATION METHOD, COATING LIQUID, AND ELECTRONIC DEVICE HAVING PORTION COATED WITH PHOTO-CATALYST APATITE-CONTAINING FILM

(75) Inventors: Noriyasu Aso, Kawasaki (JP); Masato Wakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/710,975

(22) Filed: Feb. 27, 2007

(65) Prior Publication Data

US 2007/0154378 A1    Jul. 5, 2007

Related U.S. Application Data

(62) Division of application No. 11/046,852, filed on Feb. 1, 2005, now Pat. No. 7,300,710.

(30) Foreign Application Priority Data

Sep. 17, 2002 (WO) .................. PCT/JP02/09530

(51) Int. Cl.
| | |
|---|---|
| C09C 1/02 | (2006.01) |
| C01B 15/16 | (2006.01) |
| C01B 15/26 | (2006.01) |
| B01J 27/047 | (2006.01) |
| B01J 27/051 | (2006.01) |
| C03C 1/00 | (2006.01) |
| C03C 14/00 | (2006.01) |

(52) U.S. Cl. .............. 106/482; 502/219; 502/228; 423/308; 501/32

(58) Field of Classification Search ............. 106/482; 502/219, 228; 423/308; 501/32
See application file for complete search history.

(56) References Cited

U.S. PATENT DOCUMENTS

| 5,304,577 A | 4/1994 | Nagata et al. |
| 5,981,425 A * | 11/1999 | Taoda et al. ............. 502/208 |
| 6,001,394 A * | 12/1999 | Daculsi et al. ........... 424/489 |
| 6,777,357 B2 * | 8/2004 | Aso et al. ..................... 501/1 |
| 7,157,503 B2 * | 1/2007 | Wakamura ................ 523/122 |

FOREIGN PATENT DOCUMENTS

| JP | 11-130412 | 5/1999 |
| JP | 11-195345 | * 7/1999 |
| JP | 2000-042320 | 2/2000 |
| JP | 2000-327315 | 11/2000 |
| JP | 2001-191458 | 7/2001 |
| JP | 2002-126451 | 5/2002 |
| JP | 2002-146283 | 5/2002 |
| JP | 2003-334883 | * 11/2003 |

OTHER PUBLICATIONS

International Search Report of PCT/JP02/09530 dated Dec. 17, 2002.

* cited by examiner

*Primary Examiner*—J. A. Lorengo
*Assistant Examiner*—Patricia L. Hailey
(74) *Attorney, Agent, or Firm*—Westerman, Hattori, Daniels & Adrian, LLP.

(57) ABSTRACT

A film containing a photo-catalyst apatite contains an inorganic coating main material, and a powdered photo-catalyst apatite and powdered titanium oxide that disperse within the inorganic coating main material, in which the total content of the photo-catalyst apatite and the titanium oxide is 0.01-5 wt %.

5 Claims, 5 Drawing Sheets

FILM CONTAINING A PHOTO-CATALYST APATITE, ITS FORMATION METHOD, COATING LIQUID, AND ELECTRONIC DEVICE HAVING PORTION COATED WITH PHOTO-CATALYST APATITE-CONTAINING FILM

CROSS REFERENCE TO RELATED APPLICATION

This is a divisional application of U.S. application Ser. No. 11/046,852 filed on Feb. 1, 2005, which is hereby incorporated by reference, which is a continuation of international application PCT/JP2002/009530 filed on Sep. 17, 2002, which is hereby incorporated by reference.

TECHNICAL FIELD

The present invention relates to a film containing a photo-catalyst apatite that has a photo-catalytic function; its formation method; a coating liquid for the purpose of forming the film; and an electronic device that has a portion coated with the film.

BACKGROUND ART

Finger grease or cigarette tar, or dust from the grease or tar may adhere to electronic devices, such as laptop computers or cellular phones, depending upon the mode of use. Further, the adhesion of the finger grease to the electronic devices tends to accelerate the propagation of various germs on the surface of the devices. If contamination due to the finger grease, cigarette tar or various germs is left as it is, the appearance of the electronic devices and their cleanliness, by extension, may be ruined. In the meantime, as interest in the anti-bacterial effect in the living environment becomes greater for electronic devices, such as laptop computers or cellar phones, the anti-bacterial properties to a chassis and operation keys have come to be demanded. Consequently, in the field of the electronics devices, the introduction of anti-bacterial and anti-fouling technologies as an appropriate response to contamination due to finger grease, cigarette tar or various germs has been desired.

In recent years, a photo-catalytic function in some semiconductor substances, such as titanium oxide ($TiO_2$), has been noticed, and it has been known that the anti-bacterial effect and the anti-fouling effect can be demonstrated based upon the photo-catalytic function. In semiconductor substances that have a photo-catalytic function, in general, the absorption of a light that has energy, which is equivalent to a band gap between a valence band and a conduction band, results in the transition of electrons in the valence band to the conduction band, which electron transition causes the generation of a positive hole in the valence band. Electrons in the conduction band are characterized by migrating into the substance, which is then absorbed onto the surface of the photo-catalytic semiconductor, enabling the reduction of the absorbate. Positive hole in the valence band are characterized by drawing the electrons out of a substance which has been absorbed onto the surface of the photo-catalytic semiconductor, enabling the oxidization of the absorbate.

In titanium oxide ($TiO_2$) that has the photo-catalytic function, electrons that have transited to the conduction band reduce oxygen in the atmosphere and generate a superoxide anion ($.O_2^-$), along with which, positive hole that have been generated in the valence band oxidize absorption water on the surface of the titanium oxide, and generate a hydroxyl radical ($.OH$). The hydroxyl radical has very strong oxidizability. Consequently, when an organic substance is absorbed into photo-catalystic titanium oxide, the organic substance may be broken down into water and carbon dioxide due to the effect of the hydroxyl radical.

Titanium oxide that can accelerate the oxidative breakdown reaction in an organic substance based upon the photo-catalystic function is widely used in anti-bacterial agents, disinfecting agents, anti-fouling agents, deodorants and environmental agents generally. However, the titanium oxide itself lacks the function of absorbing some substances on the surface. Therefore, in order to sufficiently benefit from the oxidative breakdown effect of the titanium oxide based upon its photo-catalytic function and the anti-bacterial effect and the anti-fouling effect by extension, it is necessary to improve the contact efficiency between a subject broken down by oxidization, and the titanium oxide.

Technologies that aim at the improvement of the contact efficiency between the breakdown subject and titanium oxide, for example, are disclosed in JP-A-2001-191458 and 2002-126451. In these technologies, an inclusion of powdered titanium oxide and powdered pre-determined hydroxyapatite (HAP) is used. HAP, in general, has a high absorption power. In the technologies in the above-mentioned publications, situating HAP with a high absorption power in the vicinity of the titanium oxide results in the improvement of the contact efficiency between a breakdown subject and the titanium oxide.

However, according to JP-A-2001-191458 and 2002-126451, since titanium oxide and HAP disperse within a pre-determined binder as mutually independent particles, titanium oxide particles where its contact efficiency with a breakdown subject will not be sufficiently improved may exist. In the case that separation between the titanium oxide particles and the HAP particles are comparatively great, the contact efficiency of the breakdown subject to the titanium oxide particles will not be sufficiently improved.

Another technology that aims at the improvement of the contact efficiency between a breakdown subject and titanium oxide, for example, is disclosed in JP-A-2000-327315. In the publication, a photo-catalytic apatite where a substance, for example, titanium oxide, that has a photo-catalytic function, and another substance, for example, calcium hydroxyapatite (CaHAP), that excels in its capacity to absorb particularly an organic substance, such as protein, are conjugated at the atomic level, is disclosed. The photocatalysitic apatite specifically has a crystal structure where Ti has been substituted for a portion of Ca comprising CaHAP ($Ca_{10}(PO_4)_6(OH)_2$), and a titanium oxide-like substructure, which approximates the chemical structure of the photo-catalytic titanium oxide, formed at a site where the Ti has been introduced. Since the titanium oxide-like substructure where the photo-catalytic function can be demonstrated is inherent in the crystal structure of CaHAP, which excels in the absorptivity of an organic substance, the contact efficiency between an organic substance—a breakdown subject—and the titanium oxide-like substructure is effectively improved. As a result, it becomes possible to effectively break down an organic substance by oxidizing such things as finger grease or bacteria cell membranes in a titanium oxide-like substructure.

Kneading or adhering the photo-catalytic apatite to a pre-determined member in an electronic device enables the provision of excellent anti-bacterial and anti-fouling properties to the member. From the viewpoint of improving anti-bacterial and anti-fouling properties, the more the photo-catalytic apatite is kneaded or adhered to the member, the better. However, according to a manufacturing method for the photo-catalystic apatite disclosed in the above-mentioned Publication of Japanese Laid-Open Patent application 2000-327315, the photo-catalystic apatite is obtained as a white powder. Consequently, if the photo-catalystic apatite is used as an anti-bacterial agent or an anti-fouling agent, an essential color tone of the member may be affected because the photo-catalystic apatite is white. Further, the photo-catalystic apatite has a tendency for fine particles to agglomerate with each other in a solvent, which tendency may affect the texture of the member due to the agglomeration. In electronic devices, such as laptop computers or cellar phones, there are many cases where this nonconformity should be avoided relative to a chassis, or a transparent cover for display screen protection.

If the quantity for use of the photo-catalystic apatite is simply reduced for the purpose of avoiding the appearance of non-conformity, it tends to proportionally reduce the anti-bacterial effect and the anti-fouling effect of the photo-catalystic apatite on the surface of the member. Consequently, when using the photo-catalystic apatite as an anti-bacterial agent or an anti-fouling agent, it is difficult to avoid the appearance of nonconformity while the anti-bacterial effect and the anti-fouling effect are highly maintained. Therefore, in electronic devices, such as laptop computers or cellar phones, it has not been conventionally practical to use a photo-catalystic apatite as an anti-bacterial agent or an anti-fouling agent.

In the meantime, stains that adhere on the electronic devices, such as laptop computers, may be removed by a wiping operation. Even in the case where anti-fouling properties are added to a pre-determined member in the electronic device by kneading or adhering the above-mentioned photo-catalystic apatite, since the catalystic function of the photo-catalystic apatite decreases especially under conditions where the quantity of light irradiation is small, the necessity of the operation to wipe the stains is high. However, if the wiping operation is excessively performed, it tends to remove the photo-catalystic apatite particles from the member surface, so the anti-bacterial effect and the anti-fouling effect based upon the photo-catalystic oxidative breakdown effect of the photo-catalystic apatite on the member surface may deteriorate.

DISCLOSURE OF THE INVENTION

The present invention has been invented under these circumferences, and its objective is to provide a film containing a photo-catalyst apatite, which sufficiently demonstrates an anti-bacterial effect and an anti-fouling effect generally. Concurrently, where stains are easily removed, and for which there is excellent transparency; its formation method includes a liquid coating for the purpose of forming the film containing a photo-catalyst apatite; and an electronic device that has a portion coated with film containing a photo-catalyst apatite.

According to a first aspect of the present invention, a film containing a photo-catalystic apatite is provided. This film containing a photo-catalyst apatite contains an inorganic coating main material, a powdered photo-catalyst apatite and powdered titanium oxide that disperse within the inorganic coating main material, in which the total content of the photo-catalyst apatite and titanium oxide is 0.01-5 wt %. Here, the photo-catalyst apatite is an apatite where a portion of metal atoms contained in the apatite crystal structure include a photo-catalystic metal atom, which is a metal atom that can function as the center of a photo-catalyst in an oxide state. Further, it is preferable that the inorganic coating main material be substantially transparent, in which its transmittance in the visible range is 90% or higher.

In the photo-catalyst apatite used in the present invention, an apatite that comprises its basic skeleton can be expressed by the following general formula:

$$A_X(BO_Y)_Z X_S \qquad (1)$$

The symbol 'A' in the formula (1) indicates any of various metal atoms, such as Ca, Co, Ni, Cu, Al, La, Cr, Fe or Mg. The symbol 'B' indicates an atom, such as P or S. The symbol 'X' is a hydroxyl radical or a halogen atom (such as, F or Cl). Specifically, as the apatite that comprises the basic skeleton of the photo-catalyst apatite, for example, hydroxyapatite, fluorapatite, chloroapatite, tricalcium phosphate and calcium hydrogenphosphate, can be provided. The apatite that is preferably used in the present invention is hydroxyapatite where the symbol 'X' in the above-mentioned formula is a hydroxyl radical (—OH). More preferably, the apatite is calcium hydroxyapatite (CaHAP) where the symbol 'A' in the above-mentioned formula is calcium (Ca), 'B' is phosphorus (P) and 'X' is hydroxyl radical (—OH), in other words, $Ca_{10}(PO_4)_6(OH)_2$.

Since CaHAP is rich in absorptivity because the ion exchange is easily conducted both with cations and anions, it excels in the capacity to absorb an organic substance, such as protein. In addition, it has been known that the strong absorption of mold or bacteria to CaHAP enables the prevention or the inhibition of their proliferation. As the photo-catalystic metal atom contained in the photo-catalyst apatite, in other words, as a metal atom that can function as a center of the photo-catalyst in the oxide state, for example, titanium (Ti), zinc (Zn), tungsten (W), manganese (Mn), tin (Sn), indium (In) andiron (Fe), can be provided. The photo-catalystic metal atom is drawn into the apatite crystal structure as a portion of the metal atom expressed with the above-mentioned general formula, resulting in the formation of a photo-catalystic substructure that can demonstrate the photo-catalystic function in an apatite crystal structure. The photo-catalystic substructure, specifically, can be considered as a structure comprised of the photo-catalystic metal atom, drawn in as the substitute of a portion of the symbol 'A' in the formula (1), and the oxygen atom in the formula (1), equivalent to a structure of the metal oxide, which has the photo-catalystic function.

The photo-catalyst apatite that has this chemical structure demonstrates a more efficient breakdown effect and efficient anti-bacterial and anti-fouling effects by extension, due to the synergistic effect of high absorption power and its photo-catalystic function compared to other photo-catalystic metal oxides that lack an absorption power, under the condition of light irradiation. Further, in a dark place, it demonstrates the anti-bacterial effect where the high absorption power enables the absorption of mold and bacteria generally, and the proliferation of these is prevented or inhibited.

Titanium oxide used in the present invention is a photo-catalystic titanium oxide ($TiO_2$), and preferably an anatase type titanium oxide. It is known that the photo-catalystic titanium oxide demonstrates hydrophilic properties under light irradiation. In particular, the anatase type titanium oxide that has a particularly high function as a photo-catalyst demonstrates extremely high hydrophilic properties under light irradiation. Further, in the first aspect of the present invention, titanium oxide coexists with a photo-catalyst apatite that excels in absorptivity. Consequently, the contact efficiency between the titanium oxide and a breakdown subject is comparatively high, and the titanium oxide can comparatively efficiently demonstrate its catalystic breakdown effect.

The above-mentioned film containing a photo-catalyst apatite relating to the first aspect of the present invention can sufficiently demonstrate the anti-bacterial effect and the anti-fouling effect. In the photo-catalyst apatite, as mentioned above, the apatite that excels in its absorptivity and a photo-catalyst substance are conjugated at the atomic level. As a result, it demonstrates the anti-bacterial effect and the anti-fouling effect based upon the efficient photo-catalystic breakdown effect under light irradiation, and demonstrates an anti-bacterial effect based upon the absorption power in a dark place. In addition, photo-catalystic titanium oxide demonstrates the anti-bacterial effect and the anti-fouling effect based upon the photo-catalystic breakdown effect under light irradiation. As mentioned above, this demonstrates a superior anti-bacterial effect and anti-fouling effect based upon the superposition of the photo-catalystic breakdown effect of the photo-catalyst apatite and the titanium oxide under light irradiation, and demonstrates the anti-bacterial effect based upon the absorption power of the photo-catalyst apatite in a dark place. Therefore, film containing a photo-catalyst apatite relating to the first aspect of the present invention can sufficiently demonstrate its anti-bacterial effect and anti-fouling effect.

Stains adhering to film containing a photo-catalyst apatite relating to the first aspect of the present invention is easily removable. The titanium oxide contained in the film containing a photo-catalyst apatite, as described above, demonstrates superior hydrophilic properties under the light irradiation. Consequently, water easily fits in to the surface of the photo-catalyst apatite, and a stain, such as grease, adhered onto the film surface tends to migrate toward the surface due to the water. Therefore, it is possible to easily remove a stain that is adhered onto film containing a photo-catalyst apatite relating to the first aspect by wiping using water.

In order to effectively utilize the characteristics of photo-catalyst apatite and titanium oxide, the inventors of the present invention have obtained findings whereby in the film containing a photo-catalyst apatite that contains an inorganic coating main material, a powdered photo-catalyst apatite and powdered titanium oxide that disperses within the inorganic coating main material, even when the total content of the photo-catalyst apatite and the titanium oxide is low, which is 0.01-5 wt %, the appropriate dispersion of the powdered photo-catalyst apatite and the powdered titanium oxide within the inorganic coating main material enables sufficiently providing an anti-bacterial effect and anti-fouling effect, required for, for example, the surface of the electronic devices, and, it also enables the sufficient improvement of the removal property of stains.

Further, the film containing a photo-catalyst apatite relating to the first aspect of the present invention has excellent transparency. Specifically, since the content of the white photo-catalystic apatite and titanium oxide that appropriately disperse within the substantially transparent and colorless inorganic coating main material is low, which is 0.01-5 wt %, the formation with an appropriate film thickness enables the formation of a substantially transparent and colorless photo-catalyst apatite.

As described above, film containing a photo-catalyst apatite relating to the first aspect of the present invention sufficiently demonstrates the oxidative resolution effect due to a photo-catalyst apatite. Concurrently, stains can be easily removed, and it excels in the transparency.

In the first aspect of the present invention, it is preferable that the secondary particle diameter of the powdered photo-catalyst apatite and the powdered titanium oxide be 5 µm or smaller. As the particle diameter of the powdered photo-catalyst apatite and the powdered titanium oxide becomes smaller, the photo-catalystic function per unit volume in the photo-catalyst apatite and the titanium oxide tends to be greater, and, there is the appearance of non-conformity after the film formation tends to decrease.

It is preferable that the ratio of the content of the photo-catalyst apatite to the total content of the photo-catalyst apatite and the titanium oxide is 20-80 wt %. This formulation is preferable to sufficiently benefit from the function of the photo-catalyst apatite and the titanium oxide.

It is preferable that the photo-catalyst apatite be a titanium modified calcium hydroxyapatite (Ti—CaHAP) where Ti has been substituted for a portion of Ca in CaHAP. Ti—CaHAP has both superior absorption power from CaHAP and the superior photo-catalystic function from the titanium oxide together.

It is preferable that the titanium oxide be an anatase type titanium oxide. The anatase type titanium oxide demonstrates an extremely high hydrophilic property under light irradiation. As the hydrophilic property on the film surface becomes higher, the removal of stains from the film due to the aqueous medium, such as water, tends to be easier.

According to a second aspect of the present invention, a formation method for the film containing a photo-catalyst apatite is provided. This formation method includes a process to prepare a liquid coating, which contains a powdered photo-catalyst apatite, powdered titanium oxide and an inorganic coating main material, and, where a total content of the photo-catalyst apatite and the titanium oxide is 0.01-5 wt %, and, it also includes another process to apply the liquid coating onto a base material.

According to this method, the film containing a photo-catalyst apatite relating to the first aspect of the present invention can be formed. Therefore, according to the second aspect of the present invention, the above-mentioned effect relating to the first aspect in the film containing a photo-catalyst apatite to be formed is proved effective.

It is preferable that a pre-treatment process where the powdered photo-catalyst apatite and/or the powdered titanium oxide is dispersed within an alcohol solution be additionally included before the preparation process, and for the alcohol solution to be added to the inorganic coating main material in the preparation process. In this case, it is preferable that crush processing by a ball mill method be conducted in an alcohol solution that contains powdered photo-catalyst apatite and/or the powdered titanium oxide in the pre-treatment process. It is preferable that the alcohol solution where the crush processing has been performed be additionally filtered in the pre-treatment process. Crush processing by the ball mill method and the filtration result in the dissolution of the agglomeration condition of the photo-catalyst apatite and the titanium oxide in the alcohol solvent, and each particle will have a sufficiently small secondary particle diameter.

This technique enables the appropriate dispersion of the powdered photo-catalyst apatite and the powdered titanium oxide with a preferable fine particle diameter. As the particle diameter of the powdered photo-catalyst apatite and the powdered titanium oxide becomes smaller, the photo-catalystic function per unit volume in the photo-catalyst apatite and the titanium oxide becomes greater, and, the appearance nonconformity after the film formation tends to decrease.

It is preferable that the inorganic coating main material be heatless glass. When heatless glass is used as the inorganic coating main material, which is a dispersion medium of the powdered photo-catalyst apatite and the powdered titanium oxide, the liquid coating that contains these powders can be dried and hardened at room temperature after being applied. For example, as the heatless glass, one that contains 70-80 wt % of alcohol-soluble inorganic resin, 5-12 wt % of isopropyl alcohol, 3-4 wt % of methanol and 2-3 wt % of dibutyltin diacetate can be used. According to a third aspect of the present invention, liquid coating is provided which contains powdered photo-catalyst apatite, powdered titanium oxide and the inorganic coating main material. The total content of the photo-catalyst apatite and the titanium oxide is 0.01-5 wt %. This type of liquid coating can be used in the method relating to the second aspect of the present invention.

According to a fourth aspect of the present invention, an electronic device is provided which has a portion that is coated with the film containing a photo-catalyst apatite, which contains an inorganic coating main material, a powdered photo-catalyst apatite and powdered titanium oxide that disperses within the inorganic coating main material, and whose total content of the photo-catalyst apatite and the titanium oxide is 0.01-5 wt %.

An electronic device that has the above-mentioned construction, such as a laptop computer, a cellular phone or a PDA, can be obtained by applying the film containing a photo-catalyst apatite onto a pre-determined portion of the member that comprises the electronic device using the method relating to the second aspect of the present invention. As the member that comprises the electronic device, for example, a chassis, operation keys and a transparent cover for display screen protection can be provided. Film containing a photo-catalyst apatite relating to the first aspect sufficiently demonstrates the anti-bacterial effect and the anti-fouling effect, and stains adhered onto the device can be easily removed. Concurrently, it excels in a transparency. Therefore, in an electronic device relating to the fourth aspect, the sufficient anti-bacterial effect and anti-fouling effect are provided due to the film containing a photo-catalyst apatite, and stains adhered onto the device can be easily removed. Concurrently, there are portion that will not affect the appearance because of the film.

In the second through fourth aspects of the present invention, it is also preferable that the secondary particle diameter of the photo-catalyst apatite and the titanium oxide be 5 μm or smaller. It is preferable that the ratio of content of the photo-catalyst apatite to the total content of the photo-catalyst apatite and the titanium oxide shall be 20-80 wt %. It is preferable that the photo-catalyst apatite have a chemical structure where Ti has been substituted for a portion of Ca in calcium hydroxyapatite. Further, it is preferable that the titanium oxide be an anastase type titanium oxide.

BEST MODE FOR CARRYING OUT THE INVENTION

The film containing a photo-catalyst apatite relating to the present invention contains an inorganic coating main material, a powdered photo-catalyst apatite and powdered titanium oxide that disperse within the inorganic coating main material. The total content of the photo-catalyst apatite and the titanium oxide in the film containing a photo-catalyst apatite is 0.01-5 wt %.

The inorganic coating main material is a medium for the purpose of appropriately dispersing the powdered photo-catalyst apatite and the powdered titanium oxide, and is substantially transparent. In the present embodiment, the transmittance of the inorganic coating main material in the visible region is 90% or higher. In the present embodiment, the inorganic coating main material is formed from heatless glass. The heatless glass can be dried and hardened at room temperature. As the heatless glass, one that contains 70-85 wt % of alcohol-soluble inorganic resin, 5-12 wt % of isopropyl alcohol, 3-5 wt % of methanol, and 2-5 wt % of dibutyltin diacetate can be used. Since the inorganic coating main material is comprised of an inorganic resin, where the inter-atomic bond energy is comparatively high, even though the photo-catalyst apatite and the titanium oxide, which can function as a solvent for the breakdown reaction of an organic substance where the inter-atomic bond energy is comparatively low, it cannot function as a solvent for the breakdown reaction of the inorganic coating main material.

Figure 1:
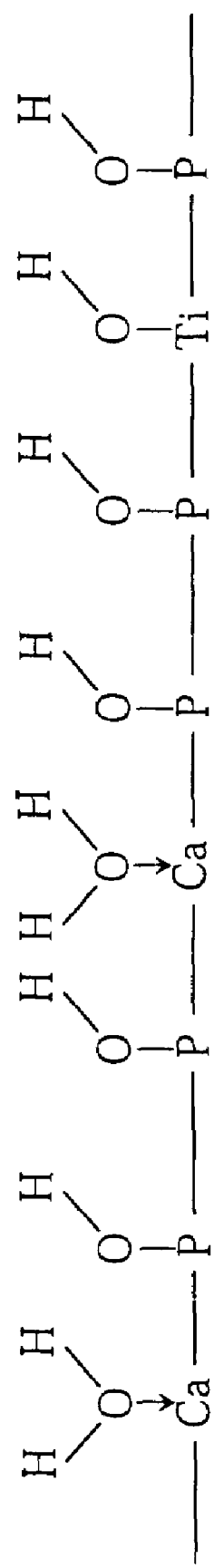
FIG. 1 shows a model of the surface chemical structure of the photo-catalyst apatite that is used in the present invention.

For the photo-catalyst apatite used in the present invention, a metal oxide that demonstrates a photo-catalystic function and a so-called apatite are conjugated at the atomic level. As the metal for the purpose of demonstrating the photo-catalystic function in the photo-catalyst apatite, for example, titanium (Ti), zinc (Zn), tungsten (W), manganese (Mn), tin (Sn), indium (In) and iron (Fe) can be provided. Further, as an apatite that comprises the basic structure in the photo-catalyst apatite, for example, hydroxyapatite, fluorapatite, and chloroapatite can be provided. FIG. 1 shows a model of the surface chemical structure of Ti—CaHAP where Ti has been selected as the metal, and calcium hydroxyl apatite has been selected as the apatite.

In Ti—CaHAP, as shown in FIG. 1, the photo-catalystic substructure where Ti is regarded as an activity center is formed in the CaHAP crystal structure by drawing Ti in. In Ti—CaHAP as described above, the photo-catalyst substructure; in other words, a catalyst site, and an absorption site where the absorption power to a pre-determined organic substance (not shown in the diagram), which is a breakdown subject, disperse at the atomic scale on the same crystal surface. Therefore, Ti—CaHAP has both a high absorption power and a photo-catalystic function together, and it can effectively demonstrate the anti-bacterial effect and the anti-fouling effect.

Specifically, under the condition of light irradiation, the hydroxyl radical (.OH) is generated from the absorption water in a manner similar to the titanium oxide at the titanium oxide-like catalyst site, and organic substances are absorbed at the absorption site. The absorbed organic substances migrate along the surface of Ti—CaHAP due to the surface diffusion, and they are broken down by oxidizing by the hydroxyl radicals at the catalyst sites and in their vicinity. Further, if microorganisms are strongly absorbed at the absorption sites of Ti—CaHAP, since the proliferation of the microorganisms is prevented or inhibited, even in the case that the catalyst sites do not function as a photo-catalyst because Ti—CaHAP is not under the condition of light irradiation, the Ti—CaHAP has the anti-bacterial properties.

It is preferable that the existence ratio of the photo-catalystic metal to the all metal atoms contained in the apatite crystal structure of the photo-catalyst apatite used in the present invention be within the range of 3-11 mol % from the viewpoint to efficiently improve both the absorptivity of the photo-catalyst apatite and the photo-catalystic function. In other words, for example, it is preferable that a value of Ti/(Ti+Ca) in Ti—CaHAP be 0.03-0.11 (mole ratio). If the ratio becomes greater than 11 mol %, the crystal structure may be corrupted. If the ratio becomes less than 3 mol %, substances that are absorbed at the excessive absorption sites are not sufficiently processed at the less catalyst appearance sites, and the catalyst effect may not be sufficiently demonstrated.

Titanium oxide used in the present invention is photo-catalystic titanium oxide ($TiO_2$), and it is preferable that it be an anastase type titanium oxide. It has been known that the photo-catalystic titanium oxide demonstrates hydrophilic properties under the light irradiation. The anastase type titanium oxide that greatly functions as a photo-catalyst in particular demonstrates an extremely high hydrophilic property. In addition, titanium oxide used in the present invention can demonstrate an anti-bacterial effect and the anti-fouling effect based upon the photo-catalystic degradation effect.

In the present embodiment, the secondary particle diameter of the photo-catalyst apatite and the titanium oxide is 5 µm or smaller. Further, the ratio of the photo-catalyst apatite to the total of the photo-catalyst apatite and the titanium oxide is 20-80 wt %.

Figure 2:
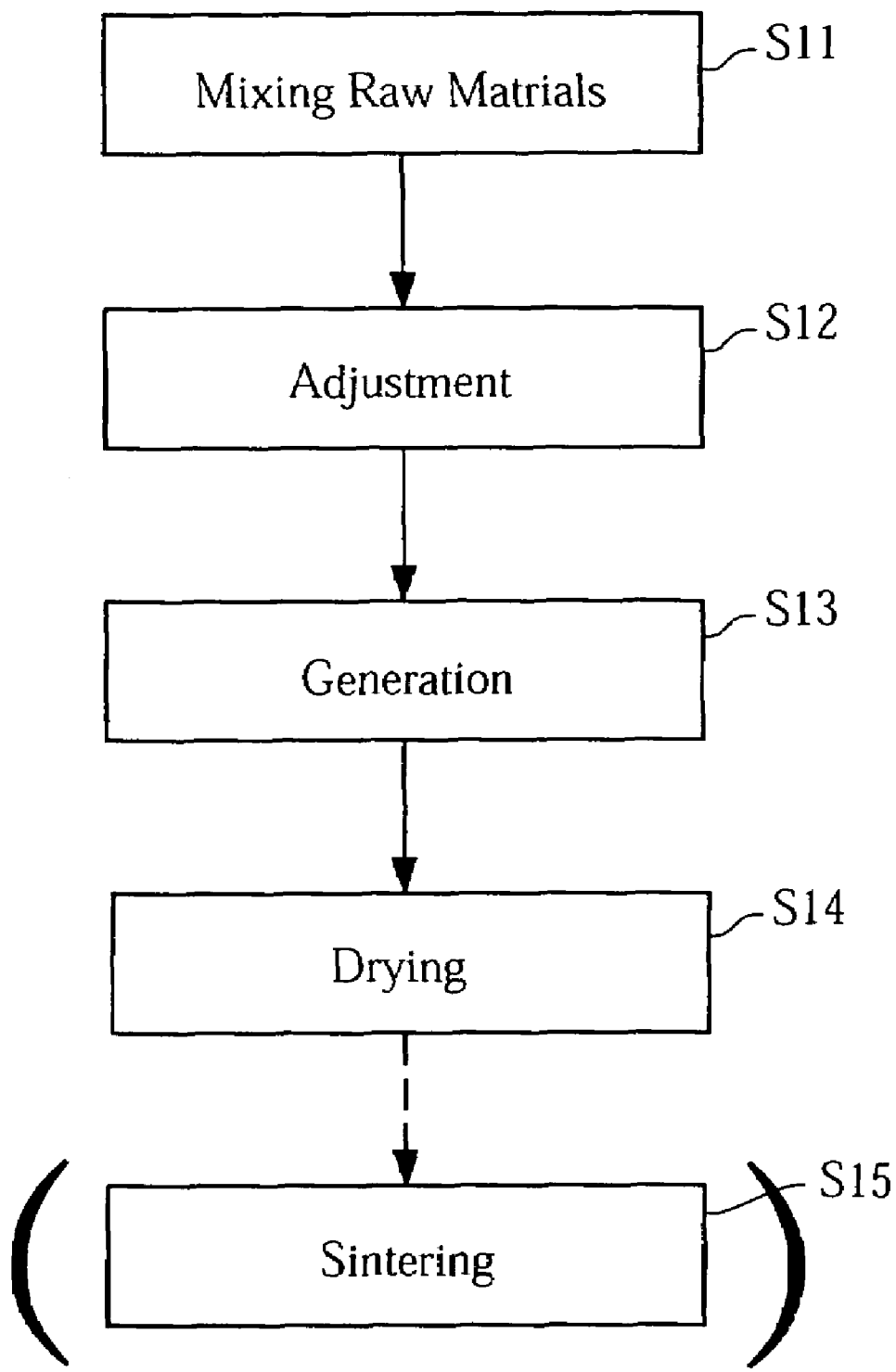
FIG. 2 is a flowchart of the manufacturing method for the photo-catalyst apatite that is used in the present invention.

FIG. 2 is a flowchart in the manufacturing of the photo-catalyst apatite that is used in the formation method for the film containing a photo-catalyst apatite. In the manufacturing of the photo-catalyst apatite, at first, in a raw material mixing process S11, raw materials so as to comprise the photo-catalyst apatite are mixed. For example, chemical species equivalent to A, $BO_Y$, X and a photo-catalystic metal ion in the above-mentioned apatite general formula are added in a pre-determined amount to a single solution system, respectively, and mixed. In the case of forming Ti—CaHAP as a photo-catalyst apatite, calcium nitrate generally can be used as a Ca supply agent. Phosphoric acid generally can be used as a $PO_4$ supply agent. Hydroxyl radicals are supplied from an alkali solution, such as an ammonium solution, a potassium hydroxide solution or a sodium hydroxide, which will be used in the below-mentioned pH adjustment. Titanium chloride or titanium sulfate can be used as a Ti supply agent as the photo-catalystic metal.

It is preferable that the ratio of the photo-catalystic metal to the total metal atoms contained in the apatite crystal structure be within the range of 3-11 mol %, as mentioned above. Therefore, in the raw material mixing process S11, it is preferable that the supply quantity of each raw material be determined and the relative substance quantity supplied and be adjusted to allow the ratio of the photo-catalystic metal for the formation of a photo-catalyst apatite within the range of 3-11 mol %.

Next, in a pH adjustment process S12, the pH of the raw material solution prepared as described above is adjusted to a pH where the generation reaction of a target photo-catalyst apatite will commence. For the pH adjustment, an ammonium solution, a potassium hydroxide solution or a sodium hydroxide solution can be used. For example, in the case of forming T—CaHAP as the photo-catalyst apatite, it is preferable that the pH of the raw material solution be adjusted to be within the range of 8-10.

Next, in a generation process S13, the acceleration of the generation of a photo-catalyst apatite results in the enhancement of crystallinity of the target photo-catalyst apatite. Specifically, aging of a raw material solution where an apatite ingredient and a portion of the photo-catalystic metal have been co-precipitated at 100° C. for 6 hours enables obtaining a photo-catalyst apatite with high crystallinity. For example, in the case of manufacturing Ti—CaHAP, in the present process, on the occasion of the co-precipitation, the Ti ion is drawn into the Ca position in the apatite crystal structure, and Ti—CaHAP grows.

Next, in a drying process S1 four the photo-catalyst apatite produced in the previous process, is dried. Specifically, after the powdered photo-catalyst apatite precipitated in the production process S13, is filtrated, the filtrated deposit is rinsed with purified water, and is additionally dried. It is preferable that the drying temperature be 100-200° C. The present process results in the elimination of the liquid ingredient in the raw material solution from the photo-catalyst apatite.

A sintering process S15 is added to a powdered photo-catalyst apatite that has been manufactured as described above, as required. In the sintering process S15, re-heating of the photo-catalyst apatite in addition to the drying process S14 results in sintering the photo-catalyst apatite. It is preferable that the sintering temperature be within the range of 580-660° C. For example, in Ti—CaHAP, adding the present process tends to result in the improvement of photo-catalystic activity.

Figure 3:
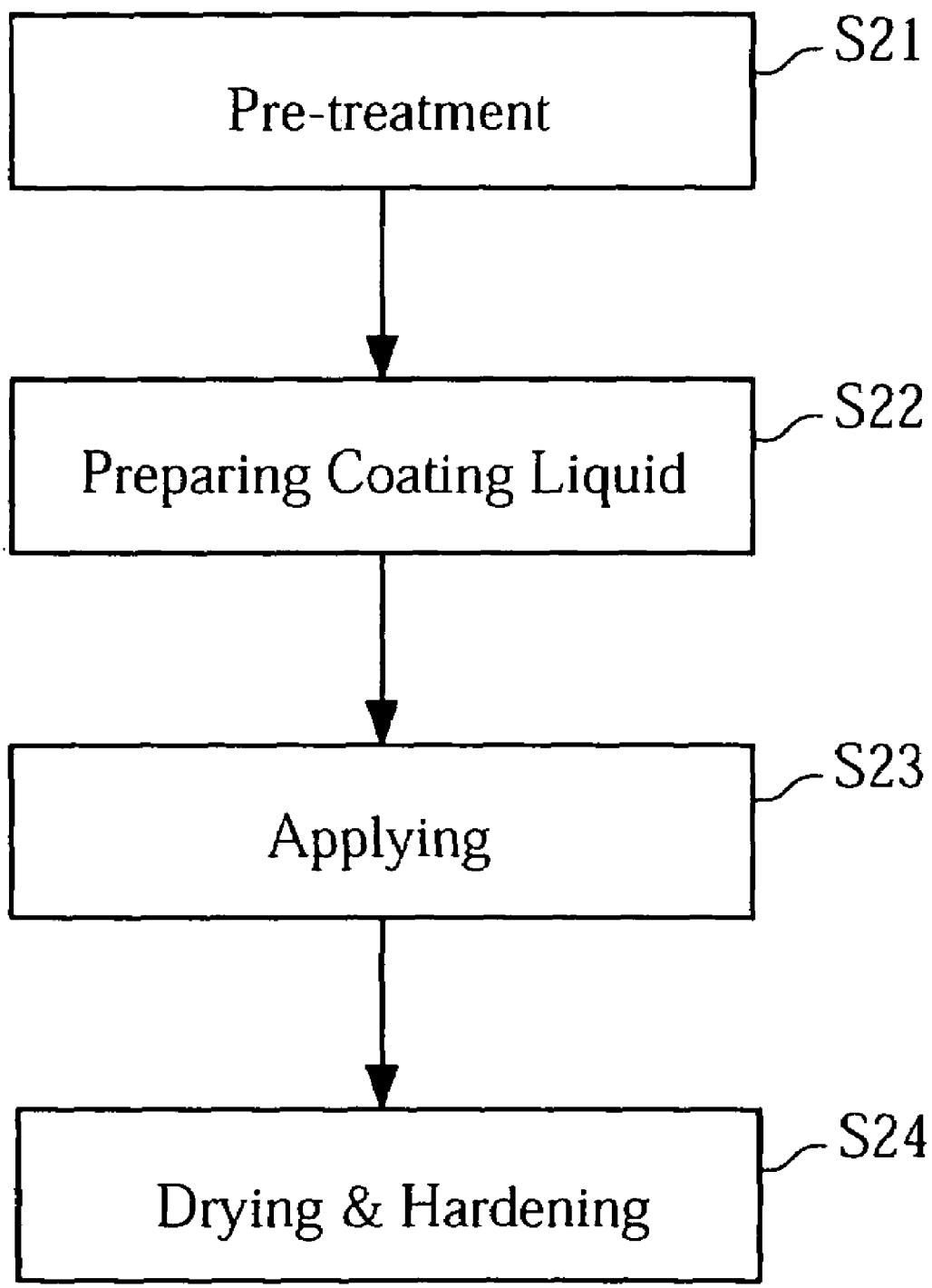
FIG. 3 is a flowchart of the formation method for the film containing a photo-catalyst apatite relating to the present invention.

FIG. 3 is a flowchart of a formation method for the film containing the photo-catalyst apatite of the present invention. In the formation of the film containing a photo-catalyst apatite, at first, in a pre-treatment process S21, pre-treatment is accomplished of the powdered photo-catalyst apatite and the powdered titanium oxide. In powdered photo-catalyst apatite obtained as described above and commercial powdered titanium oxide, the primary particles agglomerate with each other and comparatively large secondary particles are formed. Hence, in order to dissolve the agglomeration state, before mixing with the below-mentioned inorganic coating main material, these powders are pre-treated. Specifically, at first, the photo-catalyst apatite and the titanium oxide are added to alcohol, and these are mixed. The addition weight ratio of the photo-catalyst apatite to the titanium oxide is 2:8 through 8:2. As alcohol, for example, isopropyl alcohol or ethanol can be used. Next, crush processing is conducted of the alcohol solution using a ball mill until the secondary particle diameter of the photo-catalyst apatite and the titanium oxide becomes 5 µm or less, respectively. Crush processing using the ball mill is conducted, for example, for 1 hour with the use of balls made from zirconium with 10 mm of diameter; subsequently, for 1 hour with the use of balls with 5 mm of diameter; subsequently, for 1 hour with the use of balls with 3 mm of diameter; subsequently, for 1 hour with the use of balls with 1.75 mm of diameter; and then, for 1 hour with the use of balls with 1 mm of diameter. Instead of crush processing, the alcohol solution can be filtered to make the secondary particle diameter of the photo-catalyst apatite and the titanium oxide be 5 μm or less, respectively. Or, the secondary particle diameter of the photo-catalyst apatite and the titanium oxide in the alcohol solution may be 5 μm or less by the filtration, respectively, after making the secondary particle diameter of the photo-catalyst apatite and the titanium oxide be 5 μm or less due to the crush processing.

Next, a liquid coating containing an apatite is prepared in a liquid coating preparation process S22. To be specific, the alcohol solution that has been obtained as described above is added to the inorganic coating main material, and these are mixed. At this time, the alcohol solution will be added to the inorganic coating main material so as to allow the total content of the photo-catalyst apatite and the the titanium oxide to be 0.01-5 wt %. Since the photo-catalyst apatite and the titanium oxide in the present invention tend to show a strong breakdown effect to organic substances, as the main material of the liquid coating, the inorganic coating main material not broken down by the photo-catalyst apatite, is used. As the inorganic coating main material, heatless glass is used in the present embodiment. As the heatless glass, for example, 'ceraz' (manufactured by Daiwa, Inc.), 'Juvel HGS' (manufactured by Juvel Ace, Ltd.) or a cold setting type inorganic coating agent: 'S00' (manufactured by Nihon Yamamura Glass Co., Ltd.) that contains an alkyl siloxane as a main agent can be used.

Next, in an applying process S23, the liquid coating is applied by spraying onto a pre-determined portion of the chassis of an electronic device. As a technique for the application, immersion into the liquid coating, spin-coating or roll-coating can be adopted depending upon the subject to be applied instead of the spray application. Next, in a drying and hardening process S2 four the liquid coating, which has been applied onto the pre-determined portion of the chassis of an electronic device, is dried and hardened. In the present embodiment, since the heatless glass is used as the main material of the liquid coating, it is unnecessary to conduct the excessive heating in the present process.

The film containing a photo-catalyst apatite, which has been formed on the pre-determined portion of the chassis of the electronic device, contains the powdered photo-catalyst apatite and the powdered titanium oxide where their secondary particle diameter is 5 μm or less, respectively, with the content of 0.01-5 wt %, and the ratio of the content of photo-catalyst apatite to the total content of the photo-catalyst apatite and the titanium oxide is 20-80 wt %.

In the chassis of an electronic device that has a portion coated with the film containing a photo-catalyst apatite as described above, under the condition of light irradiation, cell membrane, such as mold or bacteria that are attached to the coated portion, and toxin generally from these microorganisms are efficiently broken down due to the photo-catalystic—breakdown effect of the photo-catalyst apatite and the titanium oxide. As a result, the disinfection of the microorganisms or the proliferation is prevented or inhibited, and the portion coated with the film containing a photo-catalyst apatite in an electronic device becomes anti-bacterial. Further, even if finger grease or cigarette tar is attached to the coated portion, these organic substances are efficiently broken down due to the photo-catalystic—breakdown effect of the photo-catalyst apatite and the titanium oxide, as well. As a result, the adhesion property of the organic substances to the coated portion is lowered or dust that is adhered via the organic substance becomes removable, and the portion coated with the film containing a photo-catalyst apatite in the electronic device is prevented from staining. Further, in a dark place, microorganisms generally are strongly absorbed into the film containing a photo-catalyst apatite due to the absorption effect of the photo-catalyst apatite at the absorption site. As a result, the proliferation of the microorganisms is prevented or inhibited, and the portion coated with the film containing a photo-catalyst apatite in the electronic device becomes anti-bacterial. Once the film containing a photo-catalyst apatite is exposed under the condition of light irradiation, the microorganisms where its proliferation is prevented or inhibited due to the absorption effect are broken down as described above.

Further, in an electronic device, stains that are attached onto the portion coated with the film containing a photo-catalyst apatite can be easily removed. The photo-catalystic titanium oxide contained in the film containing a photo-catalyst apatite demonstrates a superior hydrophilic property under the condition of light irradiation. Consequently, under the condition of light irradiation, water is infiltrative with the surface of the film containing a photo-catalyst apatite, and for example, stains, such as grease, tend to migrate toward the surface due to the water. Therefore, the stains that are attached onto the portion coated with the film containing a photo-catalyst apatite can be easily removed due to wiping using water. Since stains can be easily removed, it is unnecessary to excessively wipe the stains. Therefore, it appropriately can contribute to the inhibition of the removal of the photo-catalyst apatite caused by the wiping operation.

In addition, the film containing a photo-catalyst apatite that has been formed as described above excels in transparency. Since the content of the white photo-catalyst apatite and the titanium oxide that appropriately disperse within the substantially colorless and transparent inorganic coating main material is low, which is 0.01-5 wt %, the formation with an appropriate film thickness enables the film containing a photo-catalyst apatite to be substantially colorless and transparent.

As described above, the film containing a photo-catalyst apatite relating to the present invention has the anti-bacterial and anti-fouling properties, required for the chassis of an electronic device. Concurrently, it has the superior hydrophilic property, stains can be easily removed. In addition, the film containing a photo-catalyst apatite of the present invention is substantially transparent, and it does not have inappropriately large agglomeration of the photo-catalyst apatite particles, so apparent defects in the chassis of an electronic device may not occur.

Embodiment 1

<Formation of Film Containing a Photo-catalyst Apatite>

A pre-treatment was conducted to powdered Ti—CaHAP as a photo-catalyst apatite (averaged secondary particle diameter: 5.7 μm, Ti ratio: 10 mol %), and powdered anatase type titanium oxide ($TiO_2$) (averaged primary particle diameter: 7 nm, manufactured by Ishihara Sangyo Kaisha Co., Ltd.)

Specifically, at first, the Ti—CaHAP and titanium oxide were added to isopropyl alcohol (IPA), and the alcohol solution where the content of Ti—CaHAP was 20 wt % and the content of titanium oxide was 5 wt % was prepared. Next, crush processing using a ball mill was conducted of the alcohol solution. The crush processing using the ball mill was conducted for 1 hour with the use of balls made from zirconium with 10 mm of diameter; subsequently, for 1 hour with the use of balls with 5 mm of diameter; subsequently, for 1 hour with the use of balls with 3 mm of diameter; subsequently, for 1 hour with the use of balls with 1.75 mm of diameter; and then, for 1 hour with the use of balls with 1 mm of diameter. Due to this crush processing, the averaged secondary particle diameter of Ti—CaHAP becomes 3.5 μm. Concurrently, the agglomeration of titanium oxide is also reduced, and the dispersibility of Ti—CaHAP and titanium oxide in the alcohol solution is enhanced. Next, the alcohol solution was filtrated, and an alcohol solution that contained Ti—CaHAP with 2.5 μm or less of the secondary particle diameter and titanium oxide was obtained. As described above, the pre-treatment was conducted to the powder Ti—CaHAP and titanium oxide.

The amount of 0.2 g of this alcohol solution was added to 2 g of a cold setting type inorganic coating agent (a liquid material, whose product name is S00, and another liquid material, whose product name is UTE01, manufactured by Nihon Yamamura Glass Co., Ltd., are mixed with a 10:1 ratio), and these were mixed. Next, the liquid coating obtained as described above, was applied by spraying onto the chassis of a pre-determined electronic device. Drying and hardening of this solution enabled the formation of the film containing a photo-catalyst apatite on the surface of chassis of the electronic device.

The film containing a photo-catalyst apatite of the present embodiment had sufficient transparency. Further, in the film containing a photo-catalyst apatite of the present embodiment, Ti—CaHAP particles and agglomeration of titanium oxide, which might ruin the texture of the surface of the chassis, were not observed.

<Evaluation of Photo-catalystic Activity>

The photo-catalystic activity of the film containing a photo-catalyst apatite of the present embodiment was researched according to the methylene blue breakdown test. Specifically, at first, the film containing a photo-catalyst apatite of the present embodiment was formed to pre-determined portions of glass plate (100×100 mm) using a technique similar to that described, and the glass plate was colored by immersing into a 10 μM methylene blue solution. Next, this colored glass plate was irradiated with 10 mW/cm$^2$ of ultraviolet ray (irradiation wavelength region: 200-400 nm) for 12 hours using an ultraviolet ray lamp. Then, the portion where the film containing a photo-catalyst apatite had been formed was discolored, and other portion where it was not formed was not discolored. Therefore, it became ascertained that the film containing a photo-catalyst apatite of the present embodiment had a breakdown effect based upon the photo-catalystic function. Further, the transmittance of the glass plate before and after the irradiation with the ultraviolet ray was measured, and the result shown in FIG. 4 was obtained.

Figure 4:
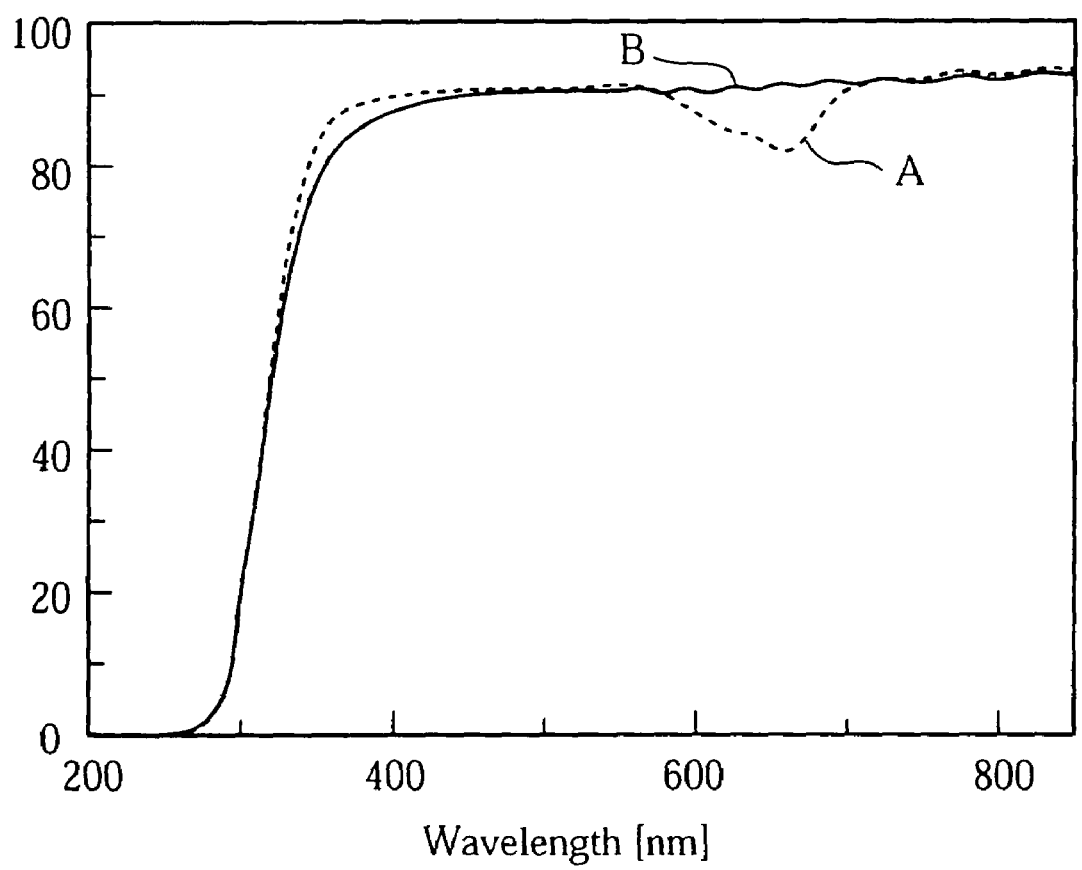
FIG. 4 shows the result of the transmittance measurement in the embodiment.

In FIG. 4, the transmittance curve A was obtained before the irradiation of ultraviolet rays, and the transmittance curve B was obtained after the irradiation of the ultraviolet ray. In the transmittance curve A, the absorption originated by the methylene blue exists in the vicinity of 650 nm. In the meantime, in the transmittance curve B, the absorption originated by the methylene blue disappeared. This suggests that the methylene blue broke down due to the photo-catalystic function of Ti—CaHAP and titanium oxide, contained in the film containing a photo-catalyst apatite. Further, the transmittance in the visible region of the glass plate where the film containing Ti—CaHAP has not been formed is approximately 90%, and as shown in FIG. 4 the transmittance in the visible region of the same glass plate where the film containing a photo-catalyst apatite has been formed is approximately 85%, so it can be understood that the film containing a photo-catalyst apatite relating to the present embodiment is substantially transparent.

<Evaluation of Hydrophilic Property>

Figure 5:
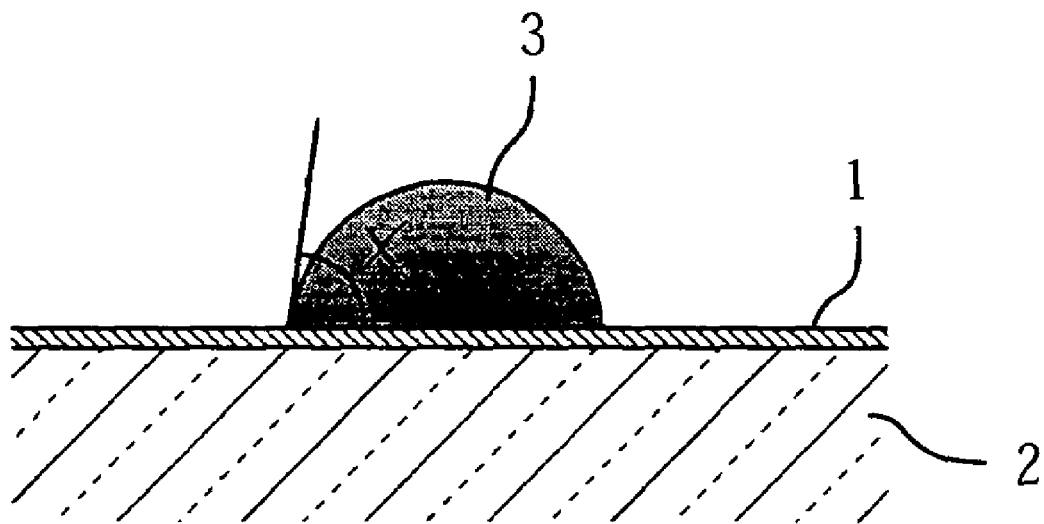
FIG. 5 shows a pattern configuration of a water droplet on the film containing a photo-catalyst apatite relating to the embodiment, under the condition where the ultraviolet ray is not irradiated.
Figure 6:
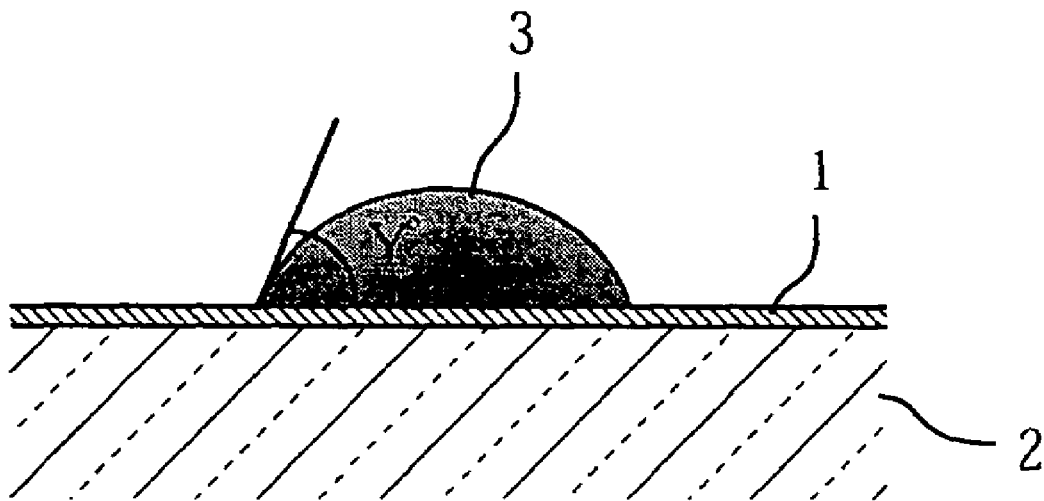
FIG. 6 shows a pattern configuration of a water droplet on the film containing a photo-catalyst apatite relating to the embodiment, under the condition where the ultraviolet ray is irradiated.

The hydrophilic property of the film containing a photo-catalyst apatite of the present embodiment was researched according to the measurement of the contact angle. Specifically, at first, the film containing a photo-catalyst apatite of the present embodiment was formed on to a pre-determined portion on the glass plate (100×100 mm) using the technique as similar to the above-described one, and 2 μn of water was instilled on the film formation portion. Under conditions where no ultraviolet ray is irradiated, a water droplet maintained the configuration as shown in FIG. 5. At this time, the contact angle of the water droplet 3 to the glass plate 2 that was coated with the film containing a photo-catalyst apatite 1 was 80°. Further, when 10 mW/cm$^2$ of ultraviolet ray (irradiation wavelength region: 200-400 nm) was irradiated using an ultraviolet ray lamp, the water droplet 3 changed to the configuration that is shown in FIG. 6. This means that the hydrophilic property of the film containing a photo-catalyst apatite 1 became great. At this time, the contact angle of the water droplet 3 to the glass plate 2 that was coated with the film containing a photo-catalyst apatite 1 was 60°. As described above, under the condition of the ultraviolet ray irradiation, it was ascertained that the film containing a photo-catalyst apatite of the present invention demonstrated a hydrophilic property. Greater hydrophilic properties are preferable to remove stains, such as grease, due to the migration of the satins to the surface of water.

COMPARATIVE EXAMPLE 1

Film containing a photo-catalyst apatite was formed onto a glass plate by processing from the pre-treatment process to the drying and hardening process to Ti—CaHAP as similar to Embodiment 1 except for the condition where the content of Ti—CaHAP in the alcohol solution was 50 wt % (Comparative example 1) instead of 5 wt %. The transmittance of the visible region relative to this film containing Ti—CaHAP was measured similarly to Embodiment 1, and a wavelength region, whose transmittance was lower than 90% in a portion of the visible region, was confirmed with the film containing a photo-catalyst apatite of Comparative example 1.

COMPARATIVE EXAMPLES 2-4

Film containing a photo-catalyst apatite was formed on the surface of the chassis of an electronic device by processing from the pre-treatment process to the drying and hardening process to Ti—CaHAP as similar to Embodiment 1 except for the condition where an alcohol solution that contained Ti—CaHAP with 8 μm or less (Comparative example 2), 11 μm or less (Comparative example 3) or 25 μm or less of secondary particle diameter instead of 2.5 μm or less was obtained in the filtration process that was processed after the crush processing using a ball mill. As a result, in the film containing a photo-catalyst apatite of Comparative example 2, Ti—CaHAP particle agglomerates were found here and there, and the texture on the surface of the chassis was ruined. In the films containing a photo-catalyst apatite of Comparative examples 3 and 4, more Ti—CaHAP particle agglomerates were observed, and the texture on the surface of the chassis was remarkably ruined.

The invention claimed is:

1. A liquid coating that contains powdered photo-catalyst apatite, powdered titanium oxide and a transparent inorganic coating main material, wherein a total content of the photo-catalyst apatite and the titanium oxide is 0.01-5 wt %, and wherein the photo-catalyst apatite and the titanium oxide have a secondary particle diameter of 5 μm or less, respectively.

2. The liquid coating according to claim 1, wherein the photo-catalyst apatite is contained at a ratio of 20-80 wt % relative to the total content of the photo-catalyst apatite and the titanium oxide.

3. The liquid coating according to claim 1, wherein the photo-catalyst apatite has a chemical structure where Ti has been substituted for a portion of Ca in calcium hydroxyapatite.

4. The film according to claim 1, wherein the titanium oxide is anatase type titanium oxide.

5. The liquid coating according to claim 1, wherein the inorganic coating main material is heatless glass.

* * * * *